United States Patent [19]

McElroy

[11] Patent Number: 5,069,484

[45] Date of Patent: Dec. 3, 1991

[54] DUCT JOINING SYSTEM

[75] Inventor: Howard J. McElroy, Cedar Rapids, Iowa

[73] Assignee: Met-Coil Systems Corporation, Cedar Rapids, Iowa

[21] Appl. No.: 478,238

[22] Filed: Feb. 9, 1990

[51] Int. Cl.[5] ............................................. F16L 35/00
[52] U.S. Cl. .................................... 285/39; 285/328; 285/363; 285/424; 285/405; 29/513
[58] Field of Search ............... 285/363, 364, 405, 406, 285/424, 906, 39, 328, 405; 29/432, 513

[56] References Cited

U.S. PATENT DOCUMENTS

| 6,428 | 5/1849 | Warner | 285/364 |
|---|---|---|---|
| 139,841 | 6/1873 | Weston . | |
| 913,685 | 3/1909 | Boyd | 285/405 X |
| 2,396,030 | 3/1946 | Terry | 285/405 |
| 3,199,901 | 8/1965 | Jeppsson . | |
| 3,347,569 | 10/1967 | Lindgren | 285/406 X |
| 3,712,649 | 1/1973 | Martin | 285/424 X |
| 4,479,288 | 10/1984 | Jones . | |
| 4,542,923 | 9/1985 | LaCrosse et al. . | |
| 4,552,388 | 11/1985 | Menly | 285/363 |
| 4,558,892 | 12/1985 | Daw et al. . | |
| 4,636,105 | 1/1987 | Johansson . | |

FOREIGN PATENT DOCUMENTS

66650US  4/1989  Australia .

Primary Examiner—Dave W. Arola
Attorney, Agent, or Firm—Jones Day Reavis & Pogue

[57] ABSTRACT

A duct joining system having two L-shaped connectors for each duct corner. Each connector has two substantially perpendicular legs forming a corner region and has an inside and an outside surface with the outside surface of one L-shaped connector abutting the outside surface of the other L-shaped connector when the ducts are joined. A orifice is formed in the corner region of each L-shaped connector in alignment with the orifice in the aubutting connector. A cleat is integrally formed with and extends inwardly from the peripheral edge of each of the orifices. A score line is formed at the base of each cleat on the outside surface of the connector to allow the cleat to be bent outwardly about the score line so as to extend through, and over the peripheral edge of, the orifice in the abutting L-shaped connector to lock the connectors together.

43 Claims, 5 Drawing Sheets

DUCT JOINING SYSTEM

FIELD OF THE INVENTION

The invention relates generally to duct joining systems used in the heating, ventilating and/or air conditioning field that have ducts typically rectangular in cross-section. More particularly, the invention relates to an L-shaped connector used in fastening adjacent duct pieces together and a method for fastening adjacent ducts using these L-shaped connectors.

BACKGROUND OF THE INVENTION

Duct joining systems are well known in the art and generally are utilized to join together the ends of adjacent duct sections such as heating and air conditioning ducts or the like. Such systems typically include couplers respectively fastened to the end edges of each of the walls forming the duct. In a general sense, each of the couplers is defined by an elongated channel adjacent each corner and an L-shaped corner connector with each leg coupled to one of the elongated channels adjacent each corner. When two of the L-shaped corner connectors, and thus the duct ends, are brought together in an abutting relationship, they can be attached together thus attaching the ends of the ducts together. Representative patents illustrating such type of construction include U.S. Pat. No. 4,636,105, Johansson, issued Jan. 13, 1987, U.S. Pat. No. 4,558,892, Daw et. al., issued Dec. 17, 1985, U.S. Pat. No. 4,542,923, La Crosse et. al., issued Sept. 24, 1985 and U.S. Pat. No. 3,199,901, Jeppsson, issued Aug. 10, 1965.

Each of these patented systems has disadvantages in the effectiveness of the coupling, the cost of manufacture, the cost of installation, or the difficulty in installation. When it is time consuming to install the L-shaped connectors, the cost of a project increases. Thus, it is important to provide a system for interconnecting ducts that comprises elements for an effective connection that are economical and simple to manufacture, and that are easily and quickly installed.

The present system provides a new and unique L-shaped corner connector design that permits the connectors to be easily and quickly locked to each other, obviating the use of a bolt or other type of separate fastener, although the design permits the use of a bolt if desired. Each of the L-shaped connectors has an orifice in the corner formed by the legs of the connector. A cleat is integrally formed with and extends inwardly from the peripheral edge of the orifice. When one of the corner connectors is reversed in position and placed in superimposed abutting relationship with a second connector, the cleats are on opposing peripheral edges of the orifices thus allowing each cleat to be forced through the adjacent orifice and bent over a raised flange or other retaining means on the edge of the adjacent orifice to lock the two connectors together.

A score line is formed at the base of each cleat on the outside surface of the connector to allow the cleat to be easily bent outwardly about the score line to extend through, and over the peripheral edge of, the orifice of the abutting L-shaped connector to lock the connectors together. Each cleat has a lip on the outer end thereof and a corresponding raised flange on the edge of the aligned orifice in the abutting connector for receiving the lip when the cleat is bent outwardly to extend through, and over the edge of, the abutting connector orifice to lock the lip over the raised flange or other locking means. In the preferred embodiment, the cleat extends inwardly from the periphery of each orifice in either direction along an axis perpendicular to a line extending from the inner corner of the L-shaped connector to the outer corner of the L-shaped connector.

In a second embodiment, the cleat extends inwardly from the periphery of each orifice in either direction along the longitudinal center line of either of the legs forming the L-shaped connector. In both of the embodiments previously mentioned, all L-shaped connectors are identically constructed and serve as both of the abutting L-shaped connectors placed back to back.

However, in the third embodiment, the cleat is integrally formed with, and extends inwardly from, the periphery of the orifice in only one of the connectors in either direction along a line extending from the inner corner to the outer corner of the L-shaped connector. This connector requires a left connector and a right connector. With the cleat lying along the line indicated, when the connector is rotated to place it in abutting relationship with another connector, the cleats on each of the connectors lie in the same plane. Thus only one of the connectors can have a cleat and there must be a left connector and a right connector.

The novel construction allows for the use of a bolt in addition to the locking features of the connector. A surface on which the bolt head or nut may rest is formed by raised flanges on the sides of the orifice surrounding the cleat on the inside surface of the connector. Each of the flanges are located substantially 90° from each other and provide surfaces for a bolt head and nut when a bolt is extended through the aligned orifices to provide means to hold the connector and ducts together. Raised flanges are important because some of the bolts that are used in these systems are not completely threaded. Thus, as they are tightened, if the connector begins to collapse, the bolt threads may be entirely used before the connectors are completely together. With the raised flanges providing a surface for the bolt, it is difficult for the bolt to move the raised flanges inwardly thus maintaining the connector shape while the bolt is being tightened.

The legs of each of the L-shaped connector are flat metal strips having the edges thereof turned toward the inside surface to provide stiffening ribs and aid in attachment to the duct piece when used with either a picture-frame type connecting system or an integrally rolled flange connecting system, both systems being well-known in the art.

Thus, it is an object of the present invention to provide a duct joining system that is effective in achieving an improved coupling in a quick fashion when the duct ends are joined together.

It is also an object of the invention to provide a duct joining system in which no special pins are required to join the duct ends.

It is yet another object of the invention to provide a method of joining duct ends with the use of connectors that lock together in a simple manner.

It is still another object of the present invention to provide an improved L-shaped connector for use in joining the ends of ducts.

SUMMARY OF THE INVENTION

The present invention improves a system for joining two ducts together at each of the corners thereof with first and second L-shaped connectors. In the preferred embodiment, each of the connectors are identical in construction and have an orifice in the corner thereof, the L-shaped connectors being in abutting relationship with each other when joining a corner of the two ducts. In the assembled configuration, the connectors comprise a cleat formed with and extending inwardly from the periphery of each of the orifices, the cleat of the orifice in a first connector extending through and over the edge of the orifice in the second connector and the cleat of the orifice in the second connector extending through and over the edge of the orifice in the first connector to lock the connectors together. Preferably, a score line is formed at the base of each cleat on the side of the connector facing the abutting connector to allow the cleat to be bent outwardly through and over the edge of the orifice in the abutting connector.

The invention also relates to an improved method of joining two ducts together at the corners thereof with first and second L-shaped connectors. In the preferred method, each of the connectors are identical in construction and having an orifice in the corner thereof, the L-shaped connectors being in abutting relationship with each other when joining the two ducts The improved method comprises the steps of integrally forming a cleat with, and extending inwardly from, the periphery of each of the orifices, bending the cleat of a first one of the connectors through and over the edge of the orifice of the second connector and bending a cleat of the second connector through and over the edge of the orifice of the first connector thereby locking the connectors together.

The improved connector has two substantially perpendicular legs forming a corner region with an orifice in the corner region. A cleat is integrally formed with and extends inwardly from the periphery of the orifice. The cleat can extend through, and over the edge of, an orifice in an abutting connector to lock the connectors together.

BRIEF DESCRIPTION OF THE DRAWINGS

These and other objects, advantages and features of present invention will be apparent on consideration of the following detailed description thereof taken in conjunction with the accompanying drawings in which like numbers represent like elements and in which.

DETAILED DESCRIPTION OF THE DRAWINGS

Figure 1:
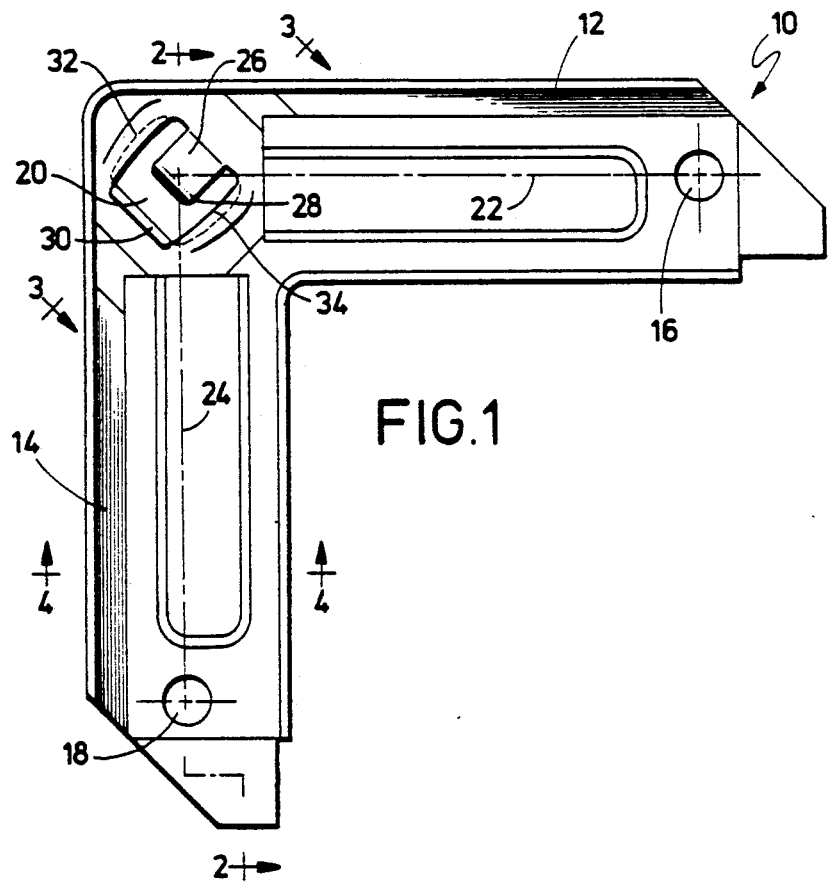
FIG. 1 is a plan view of the novel L-shaped connector of the present invention.

FIG. 1 is a plan view of the one of the novel L-shaped connectors of the present invention. The connector is designated generally by the numeral 10 and includes two legs 12 and 14 at substantially 90° with respect to each other and forming a corner region. Orifices 16 and 18 are formed in the outer ends of each of the legs 12 and 14 respectively for use as may be necessary. Orifice 20 is formed in the corner region of the L-shaped connector approximately at the intersection of the longitudinal axis 22 of leg 12 and longitudinal axis 24 of leg 14. The orifice 20, as shown, is substantially rectangular and has a cleat 26 integrally formed with and extending inwardly from the peripheral edge of the orifice 20. Cleat 26 has a lip 28 formed thereon and better shown in FIG. 2 that locks over a raised flange on the associated L-shaped connector when the connectors are locked together. The raised flange 30 in FIG. 1 provides the locking surface for the cleat 26 of the abutting connector as will be shown hereafter. Other retaining means could be used in addition to the raised flange. For instance, a recess could be formed in the connector such that lip 28 could be received by the recess and locked therein. Hereafter the term raised flange is used to include all such types of retaining means. Raised edges 32 and 34 along with flange 30 provide a base on which a bolt or nut may rest if the usual bolt is desired. Such construction is shown in detail in FIG. 9.

Figure 2:
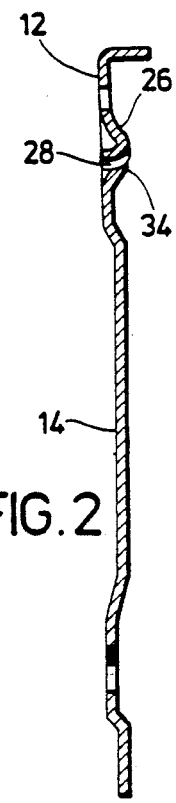
FIG. 2 is a cross section of the novel L-shaped connectors taken along lines 2—2 of FIG. 1.

FIG. 2 is a cross-sectional view taken along lines 2—2 of FIG. 1. In FIG. 2, the lip 28 on the cleat 26 is clearly shown. In addition, the raised edge 34 is also shown.

Figure 3A:
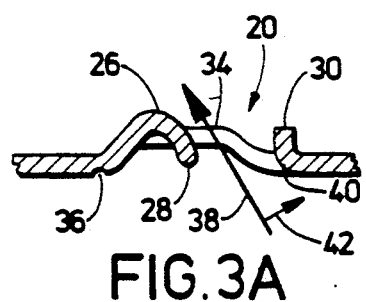
FIG. 3A is a partial cross-sectional view of the L-shaped connector of FIG. 1 taken along lines 3—3.
Figure 3B:
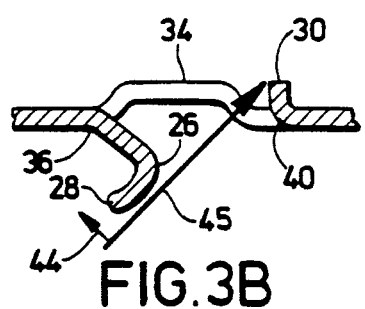
FIG. 3B is a cross sectional view of the L-shaped connector as illustrated in FIG. 3A with the cleat shown bent outwardly in the direction of its locking position.

FIG. 3A is a partial cross-sectional view taken along lines 3—3 of FIG. 1 and illustrates clearly the shape of the cleat 26 with the lip 28 formed on the outer end thereof. The cleat 26 and lip 28 are shown in FIG. 3A as manufactured and are left in that position for protection of the cleat during shipping and handling prior to final installation. Cleat 26 could be bent out of the orifice for shipping and handling but it is preferred to have cleat 26 in the manufacture position shown in FIG. 3A. Also illustrated clearly is the raised flange 30 which provides the locking surface for the cleat of the abutting L-shaped connector and raised surface 32 which, in conjunction with the raised flange 30 and the raised surface 34 shown in FIGS. 1 and 2, provides the surface on which a nut or bolt can rest should one be utilized. It will be noted in FIG. 3A that a score line 36 is formed at the base of the cleat 26. This score line allows the cleat 26 to be easily moved out of the orifice 20 and through and over the edge of raised flange 30 of the orifice of the second adjacent connector and provides a line of rotation so that, upon bending, the cleat will extend a predetermined distance consistently from part to part. In order to accomplish this task in a simple and easy manner, an elongated pin known in the trade as a drift pin, preferably having a rounded nose thereon is inserted in the orifice 20 in the direction of arrow 38 so that pressure can be applied to the lip 28 of cleat 26 and to the base 40 of the raised flange 30. By applying a counter-clockwise motion to the drift pin as indicated by the arrow 42 while the drift pin is being pulled toward the user, the cleat 26 is moved about score line 36 out of the orifice 20 as illustrated in FIG. 3B. When the cleat 26 has been moved out of the orifice 20 as illustrated in FIG. 3B, the drift pin can then be moved in the opposite direction as indicated by arrow 44 and when the drift pin is moved clockwise in the direction illustrated by arrow 44, the cleat 26 and the lip 28 thereof are snapped over the raised flange 30 of the adjacent L-shaped connector. It can be seen in FIG. 3A that moving the cleat 26 out of the orifice 20 is a simple procedure with the drift Pin providing pressure as indicated by the arrow 42. Once the cleat is out of the orifice 20 and the two connectors are placed in abutting relationship, each of the cleats 26 extends through the orifice of the adjacent connector and by inserting the drift pin as indicated by the arrow 42 in FIG. 3B, both of the cleats 26 are locked over the edges of the corresponding raised flange 30 of the opposite orifice.

Figure 4:
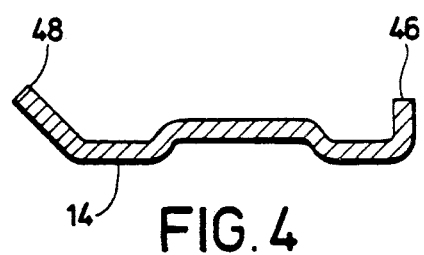
FIG. 4 is a cross sectional view of one of the legs of the novel L-shaped connector illustrated in FIG. 1 and taken along the section lines 4—4.

FIG. 4 is a cross sectional view of the leg 14 taken along the section line 4—4 in FIG. 1. As can be seen in FIG. 4, the edges 46 and 48 of leg 14 are turned toward the inside of leg 14 to provide stiffening ribs.

Figure 5B:
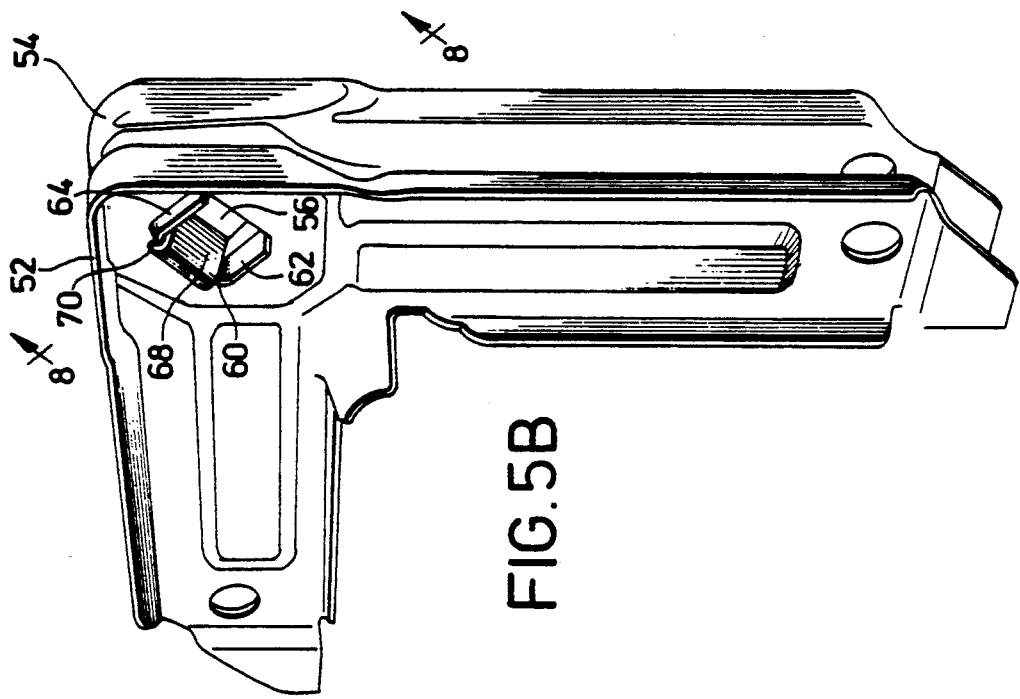
FIG. 5B is an isometric view of the two preferred L-shaped connectors shown in FIG. 5A after they have been locked together.
Figure 5A:
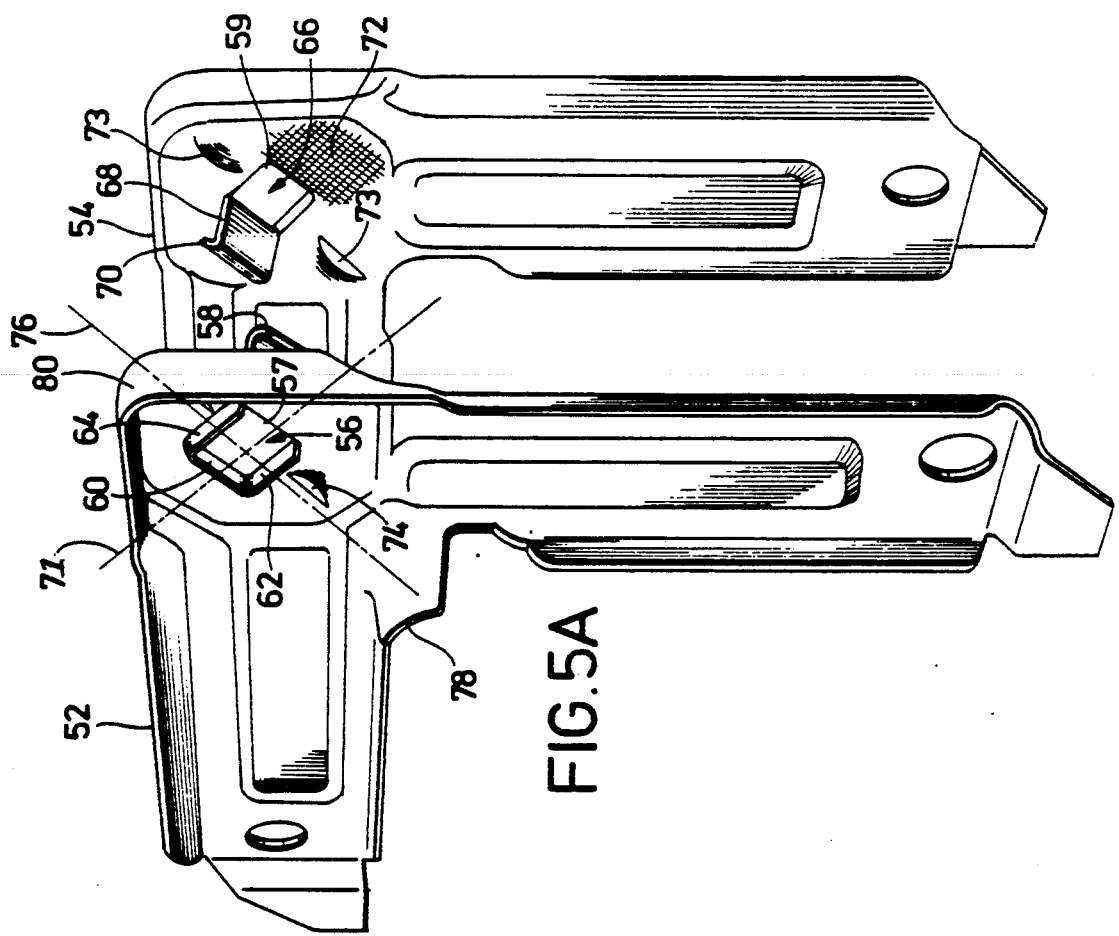
FIG. 5A is an isometric view of two of the L-shaped connectors of the preferred embodiment of the present invention in side by side relationship prior to being joined or locked together and illustrating the cleats formed in and bent away from each orifice in the direction of the locking position.

FIG. 5A is an isometric view of two of the L-shaped corner connectors of the preferred embodiment of the present invention in side by side relationship before being attached to each other. Connectors 52 and 54 are identical in construction and are simply placed in a back to back relationship with each other as shown when used. The orifice 56 shown on L-shaped connector 52 is substantially rectangular in shape, although other shapes may be used, and has a raised flange 60, and raised surfaces 62 and 64 separated from each other by 90° which, as stated earlier, provide a surface on which a bolt can rest if it is desired to use a bolt to assist in attaching the L-shaped connectors together. In addition, orifice 56 has integrally formed therewith and extending from its periphery 57 a cleat 58. The cleat 58 is shown in FIG. 5A as having been moved out of the orifice 56. This would be accomplished through the use of the drift pin as stated earlier. In like manner, the adjacent L-shaped connector 54 has an orifice 66 which has extending therefrom, and integrally formed with the periphery thereof, a cleat 68 with the bent lip 70 on the end of the cleat. The cleat 68 is shown moved or bent out of the orifice 66, accomplished with the use of the drift pin as stated earlier.

As shown in FIG. 5B, when the two L-shaped connectors 52 and 54 are placed adjacent each other, the drift pin can be inserted through the orifices 56 and 66 to snap the cleats 58 and 68 over the raised flanges 60 on a respective adjacent connector 52 and 54 as shown in FIG. 5B to lock the connectors together thereby effectively connecting the adjacent duct pieces. If desired, knurled surfaces 72 as shown in FIG. 5A can be formed on the face of each of the connectors 52 and 54 surrounding the orifices 56 and 66 so that when the connectors 52 and 54 are placed in abutting relationship, and the drift pin is used to snap the cleats 58 and 68 in place, the connectors 52 and 54 will be held relatively immovable with respect to each other. Other locking means such as offset surfaces 73 and 74 can be found in that they are in side by side abutting relationship when the connectors are placed in abutting relationship. Thus, they resist movement of the connectors 52 and 54 with respect to each other when the drift pin is used to snap the cleat 58 and 68 in place.

Figure 9:
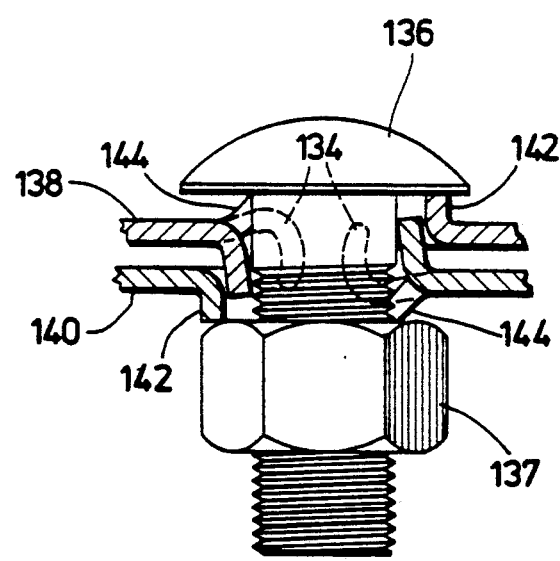
FIG. 9 is a partial cross sectional view of two of the connectors in abutting relationship wherein a bolt is inserted through the aligned orifices for providing additional support for the two ducts and the associated L-shaped connectors.

Thus, FIGS. 5A and 5B illustrate the manner in which the novel construction of the L-shaped connectors 52 and 54 allows the connectors to be locked together in a very simple and quick manner. As can be seen in FIG. 5B, if it is desired to use a bolt, the orifices 56 and 66 may be opened and a bolt inserted therethrough and a nut placed thereon and tightened. This system is much quicker to use than prior art systems because of its simplicity. For instance, in U.S. Patent No. 4,542,923, as shown in FIGS. 9 and 10, tabs extend outwardly from the edges of the L-shaped connector members and each tab must then be hammered over its own connector outer edge and outer edge of the adjacent connector in two different planes in order to hold the connectors together. The connectors illustrated in FIGS. 5A and 5B do not require any hammers and simply require a drift pin to snap the cleats in place in locking relationship with the adjacent connector.

It will be noted in FIG. 5A that the cleat 58, before it is bent outwardly from the orifice 56, extends inwardly from the periphery of the orifice 56 along an axis 71 that is perpendicular to the line 76 extending from the inner corner 78 of the L-shaped connector to the outer corner 80 of the L-shaped connector. This construction allows the manufacture of a single universal connector 52 which, when inverted and placed on an adjacent duct piece in an abutting relationship as illustrated by connector 54, allows the two cleats 58 and 68 to be folded outwardly to extend through, and over the edge of, the orifice of the abutting connector to lock the connectors together. Although it is shown in FIG. 5A that cleat 58 extends from edge 57 of orifice 56, it can be seen that the connector 52 could be constructed with the raised flange 60 appearing on the edge 57 of orifice 56 and the cleat 58 extending from the edge where raised flange 60 is shown. That would simply mean in relation to connector 54 that cleat 68 would be at surface 59 instead of where it is shown in FIG. 5A.

Figure 6B:
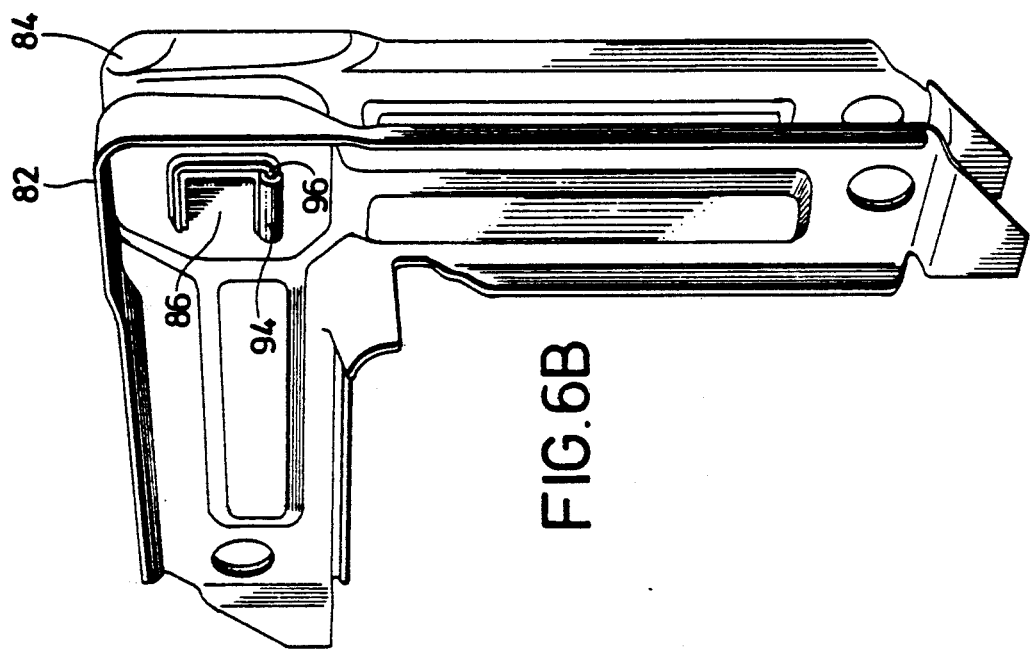
FIG. 6B is an isometric view of the alternate embodiment of the L-shaped connectors illustrated in FIG. 6A after they have been locked together.
Figure 6A:
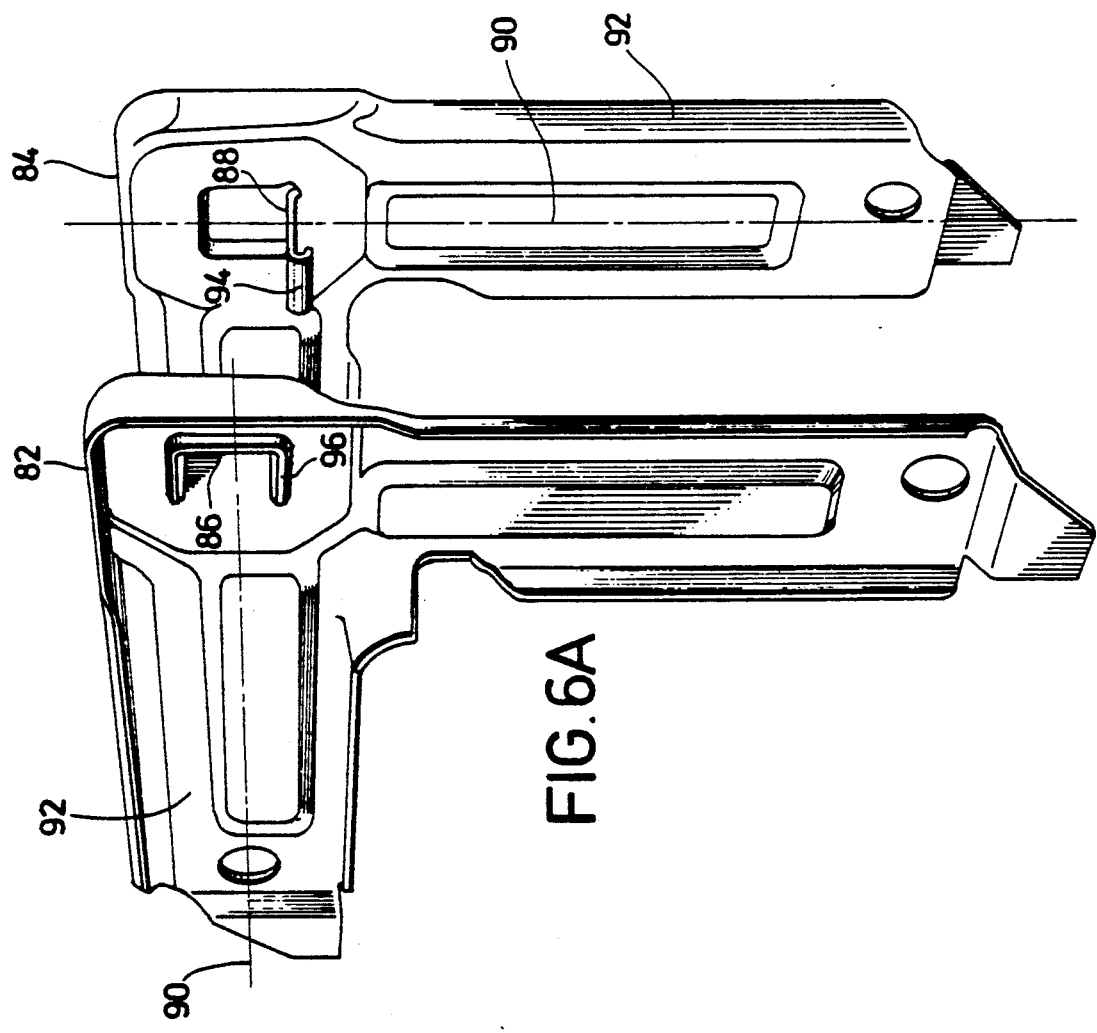
FIG. 6A is an isometric view of an alternate embodiment of the L-shaped connectors and their side by side relationship prior to being locked together.

FIG. 6A discloses an alternate embodiment of the invention and it is similar to that embodiment shown in FIG. 5A and 5B except that the substantially rectangular orifices are oriented such that the cleats 86 and 88 extend inwardly from the periphery of each orifice along the longitudinal center line of either leg of the L-shaped connector. Thus, in connector 82, cleat 86 extends inwardly along the center line 90 of leg 92. When connector 82 is inverted, rotated and placed on the other side of connector 82 as is illustrated by connector 84, leg 92 is now pointing downward and the cleat 88 extends outwardly from the orifice along center line 90 of leg 92. In this case, it will be noted that cleat 86 and cleat 88 are at right angles to each other rather than diametrically opposite each other as in FIGS. 5A and 5B. Clearance in such case between the cleats 86 and 88 is much less than that shown in FIG. 5A and thus the tolerances are more strict when utilizing this embodiment. As shown in FIG. 6B, lip 94 of cleat 88 is locked over raised flange 96 of connector 82. In like manner, cleat 86 of connector 82 is locked over a corresponding raised flange of connector 84 but it cannot be seen in FIG. 6B. By inserting the drift pin in the orifices in the manner described earlier, the cleats 86 and 88 can be snapped over the corresponding raised flanges in the opposing connector and the connectors locked together.

Figure 7B:
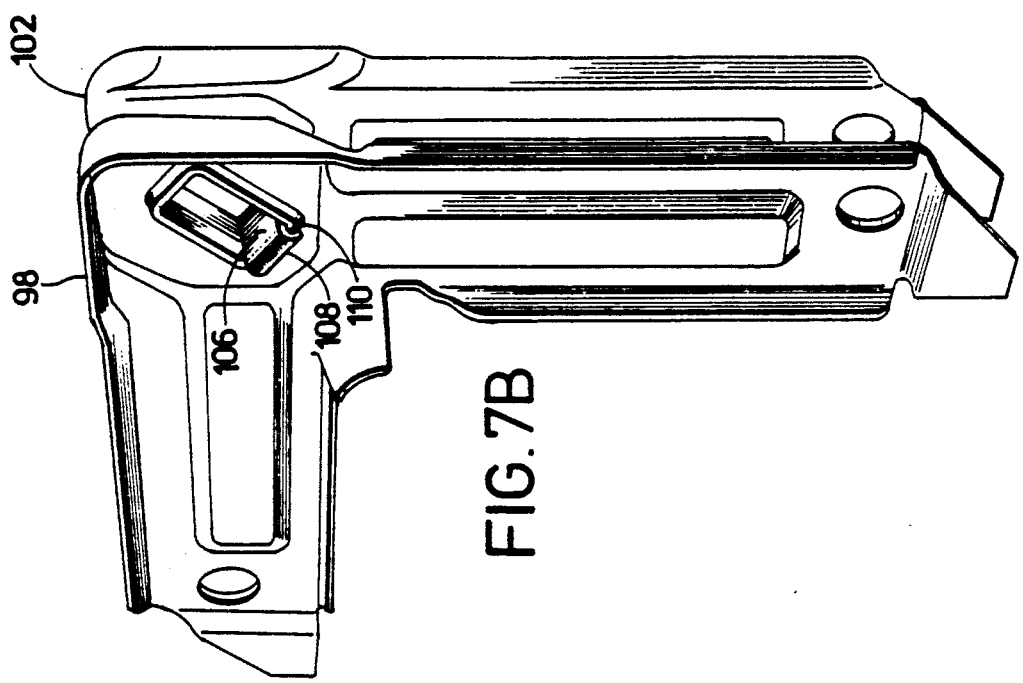
FIG. 7B is an isometric view of the embodiment of FIG. 7A with the side by side connectors locked together.
Figure 7A:
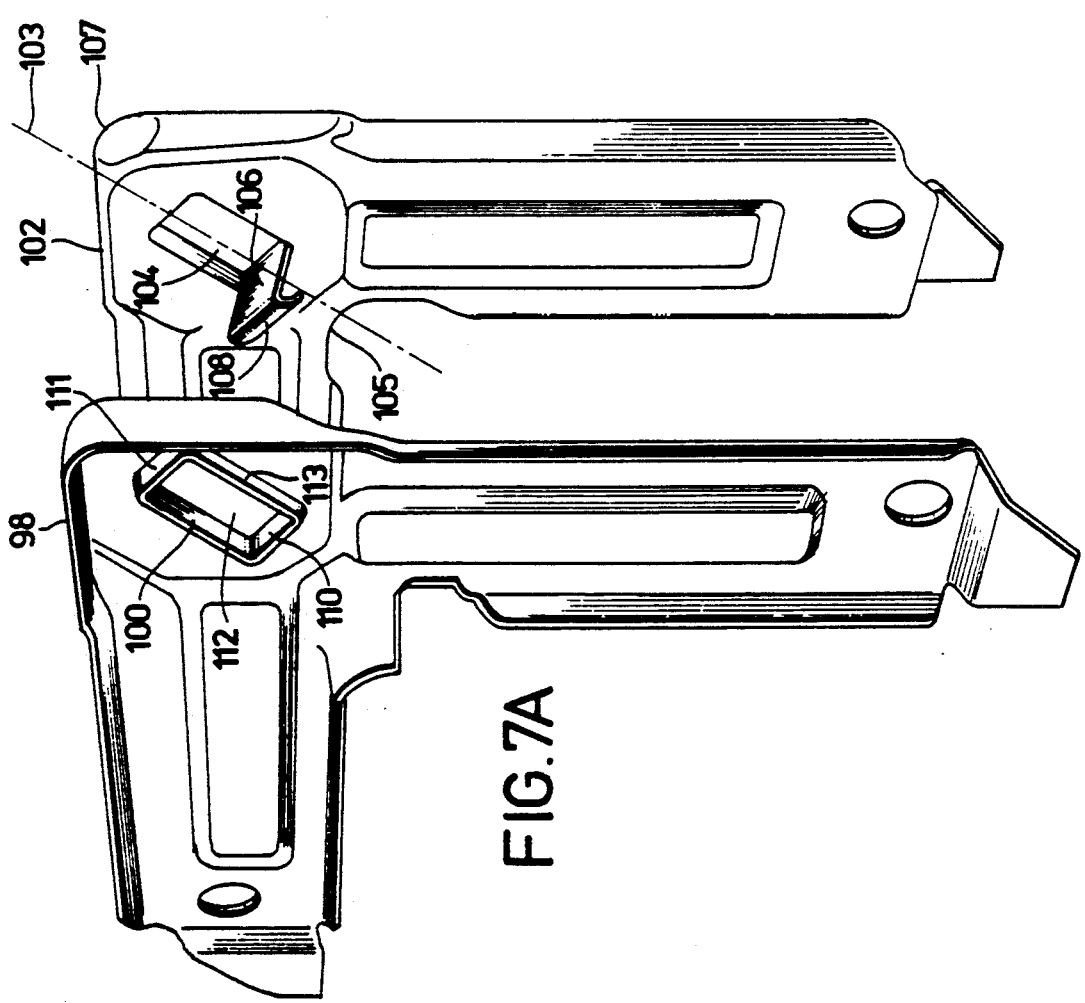
FIG. 7A is an isometric view of yet another embodiment of a novel L-shaped connector of the present invention illustrating two of the connectors in side by side relationship prior to being locked together.

In the embodiment illustrated in FIG. 7A and FIG. 7B, right and left connectors are required. Thus, as illustrated in FIG. 7A, connector 98 has an orifice 112 with raised edges 100 surrounding the orifice but does not have a cleat extending therefrom. In the adjacent connector 102, the orifice 104 has a cleat 106 extending therefrom with a lip 108 that locks over raised edge 110 of orifice 112 in connector 98. When the connectors 98 and 102 are placed together in abutting relationship as shown in FIG. 7B, the cleat 106 with lip 108 clearly locks over the raised flange 110 to lock the two connectors together. However, only one cleat is utilized in this case. This can be clearly understood when it is seen that the cleat 106 is formed with and extends inwardly from the periphery of the orifice 104 in a direction along a line 103 extending from the inner corner 105 to the outer corner 107 of connector 102. In such case, when the connectors 98 and 102 are positioned with respect to each other as shown, if a cleat were formed in the orifice 112 of connector 98, it would be in the same location on connector 102 as the cleat 106 and thus the cleats would interfere with each other. Clearly then, this is a case for "right" and "left" connectors. That means two different connectors would be manufactured and used for each duct corner with only one of the connectors having a cleat. Of course, right and left connectors may be formed with both connectors having a cleat but in such case, using FIG. 7A as the example, the cleat in connector 98 would have to extend from one of the surfaces 100, 111 or 113 of connector 98 while cleat 106 would remain as shown in FIG. 7A.

Figure 8:
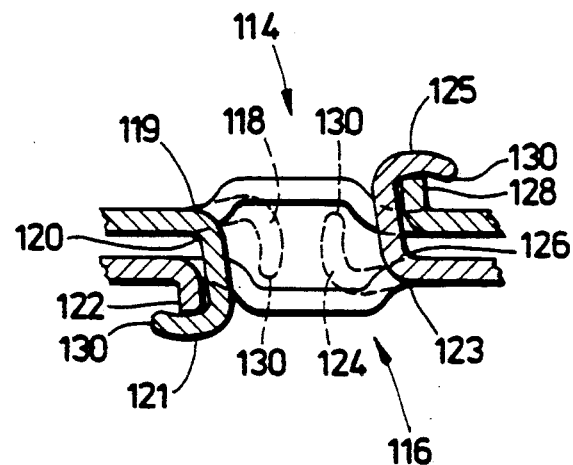
FIG. 8 is a partial cross sectional view of two of the L-shaped connectors locked to each other illustrating the manner in which the cleat from the orifice of each of the connectors is bent through and over the edge of the orifice of the other connector.

FIG. 8 is a partial cross-sectional view of two L-shaped corner connectors of the preferred embodiment illustrating the manner in which the two connectors are locked together. It can be seen in FIG. 8 that a cleat 118 integrally formed with and extending from the peripheral edge 119 of orifice 114 is bent about a score line 120 so that the cleat extends through and over the edge of the adjacent orifice 116. The cleat 118 has lip 121 at the outer end thereof and a beveled or arcuate edge 130 on the lip 121 which allows the cleat 118 to slip over the raised flange 122 and lock itself thereto. In like manner, cleat 124 is integrally formed with and extends from the peripheral edge 123 of the orifice 116 in the abutting connector. Cleat 124 is bent so that it extends through orifice 114 and over the orifice flange 128 of the orifice edge to lock itself to the raised flange 128. Again, the outer end of cleat 124 is formed with a lip 125 having an arcuate or beveled edge 130 that facilitates the outer end of cleat 124 slipping over the raised flange 128 to lock itself thereto. FIG. 8 clearly shows the simple, yet efficient manner in which the two connectors are locked together with the use of the cleats and the raised flange on the opposing connector.

FIG. 9 illustrates the manner in which a bolt and nut could be used to hold the adjacent connectors together if desired. In this case, the outer portion 134 of each of the cleats is removed by bending cleat 124 as described above and clipping off the outer portion 134 at the base. The bolt 136 is then inserted in the aligned orifices of the two connectors 138 and 140. It will be noted that the raised flange 142 and raised edges 144 of the orifice serve as surfaces for the nut and the bolt. Recall from FIGS. 1, 3A and 3B that the raised surfaces exist on three sides of the orifice thus providing the necessary support for both the nut and the bolt.

It is clear from the embodiments illustrated in FIGS. 5, 6 and 7 that the cleats could be formed in the orifices but extend from the opposite side of the orifice from that indicated in the respective FIGURES.

Thus there has been disclosed a novel duct joining system that has two L-shaped connectors for connecting each of the corresponding corners of two adjacent duct pieces. In the preferred, illustrated embodiment, each connector has an inside and an outside surface with the outside surface of one L-shaped connector abutting the outside surface of the other L-shaped connector when the ducts are joined. An orifice is formed in the corner of each L-shaped connector in alignment with the orifice in an abutting connector. A cleat is integrally formed with and extends inwardly from the peripheral edge of each of the orifices. A score line is formed at the base of each cleat on the outside surface of the connector to allow the cleat to bent outwardly about the score line so that it extends through, and over the peripheral edge of, the orifice in the abutting L-shaped connector to lock the connectors together. A lip is formed on the outer end of each cleat and a first raised flanged is formed on the corresponding edge of the aligned orifice of the abutting connector for receiving the lip when the cleat is bent outwardly to extend through and over the edge of the abutting connector orifice to lock the lip over the raised flange.

In a first embodiment, the cleat extends inwardly from the periphery of each orifice along an axis perpendicular to a line extending from the inner corner of the L-shaped connector to the outer corner of the L-shaped connector. The cleat could extend inwardly from the Periphery of the orifice along the axis in either direction.

In a second embodiment of the invention, the cleat extends inwardly from the periphery of each orifice along the longitudinal center line of either of the legs forming the L-shaped connector. Again, the cleat may extend inwardly in either direction along the longitudinal center line. The orifice is generally rectangular shaped and in the first embodiment one axis of the rectangle lies along the line extending from the inner corner of the L-shaped connector to the outer corner of the L-shaped connector.

In a third embodiment, a cleat is integrally formed with and extends inwardly from the periphery of an orifice in only one of the abutting connectors in a direction along a line extending from the inner corner to the outer corner of the L-shaped connectors. In all three embodiments the orifice is generally rectangular shaped.

Where right and left connectors are to be used, the orifice could be located in either or both legs of the connector instead of the corner thereof.

The invention has been described in connection with a preferred embodiment. This description is not intended to limit the scope of the invention to the particular form set forth, but, on the contrary, it is intended to cover such alternatives, modifications and equivalents as may be included within the spirit and scope of the invention as defined in the appended claims.

What is claimed is:

1. A method of joining the rectangular ends of two ducts, the method of comprising the steps of:
   attaching an L-shaped connector having two substantially perpendicular legs forming a corner region to each corner of each duct end, each said connector having an orifice in the corner region thereof;
   placing said duct ends in an abutting relationship such that the L-shaped connectors on each duct corner abut each other and have abutting orifices in superimposed relationships;
   integrally forming a cleat with and extending inwardly from the peripheral edge of at least one of the abutting orifices;
   forming a lip on the outer end of each cleat and a retaining means on the abutting connector; and
   bending the cleat through the abutting orifice over and around the retaining means on the abutting connector to lock the two connectors together.

2. A method as in claim 1 further comprising the step of bending a cleat in each orifice outwardly toward the abutting orifice prior to placing the duct ends in abutting relationship such that said cleats each extend through the abutting orifice when said ducts are placed in abutting relationship.

3. A method as in claim 2 further comprising the steps of:
   placing a drift pin through said abutting orifices;
   forcing said pin against said cleats to bend said cleats outwardly toward the respective abutting orifice; and
   forcing said pin against both of said cleats to bend said cleats over the edges of their respective abutting orifice.

4. A method as in claim 3 further comprising of step of using said pin to force the lip on the outer end of each cleat over and around the retaining means on said abutting connector to lock said lip over the retaining means and lock the two connectors together.

5. A method as in claim 4 further comprising the step of forming said retaining means as a raised flange for receiving and locking said cleat lip.

6. A method as in claim 4 further comprising the step of forming said retaining means as a recess for receiving and locking said cleat lip.

7. An improved L-shaped connector for use with an abutting L-shaped connector having a cleat retaining means thereon, the improved connector having two substantially perpendicular legs forming a corner region to join the corners of ducts, the improved connectors comprising:
   an orifice in the corner region of the L-shaped connector;
   a cleat integrally formed with and extending inwardly from the peripheral edge of the orifice; and
   a lip on the outer end of the cleat being bent over and around the cleat retaining means on the abutting L-shaped connector when said cleat is bent through the orifice in the abutting connector so that the abutting connectors are locked together.

8. The improved connector of claim 7 further comprising a lip as said interlocking means and an arcuate surface on said lip to facilitate said lip interlocking with said abutting L-shaped connector.

9. The improved connector of claim 7 further comprising a score line formed at the junction of said cleat and said orifice periphery to enable the cleat to be easily bent about the score line so as to extend through, and over the peripheral edge of, the orifice in said abutting L-shaped connector to lock the connectors together.

10. The improved connector of claim 7 further including locking means on each said connector so as to engage a corresponding locking means on said abutting connector to resist movement of said abutting connectors with respect to each other.

11. The connector of claim 10 wherein said locking means is a knurled surface on at least a portion of said corner region of each connector to resist movement of the abutting connectors with respect to each other during bending each cleat through and over the edge of the orifice in the abutting connector.

12. The connector of claim 10 wherein said locking means is a raised offset surface on said corner region to engage a corresponding offset surface on said corner region of an abutting connector to resist movement of the connectors with respect to each other during bending each cleat through and over the edge of the orifice in the abutting connector.

13. A duct joining system comprising:
   two L-shaped connectors for joining corresponding duct corners, each connector having two perpendicular legs forming a corner region and having an inside and an outside surface, the outside surface of one L-shaped connector abutting the outside surface of the other L-shaped connector in superimposed relationship when said ducts are joined;
   an orifice in the corner region of each L-shaped connector in alignment with the orifice in the abutting connector; and
   a cleat integrally formed with and extending inwardly from the peripheral edge of each of said orifices, each cleat being bent outwardly so as to extend through, and over the peripheral edge of, the orifice in the abutting L-shaped connector to lock the connectors together.

14. A system as in claim 13 further comprising:
   a lip on the outer end of each cleat; and
   retaining means on the abutting connector for receiving said lip when said cleat is bent outwardly and extending through and over said edge of said abutting connector orifice to lock said lip over said retaining means.

15. A system as in claim 14 further comprising a raised flange as said retaining means for receiving and locking said cleat lip.

16. A system as in claim 14 further comprising a recess as said retaining means for receiving and locking said cleat lip.

17. A system as in claim 14 wherein said cleat extends inwardly from the periphery of each orifice along an axis perpendicular to a line extending from the inner corner of said L-shaped connector to the outer corner of the L-shaped connector.

18. A system as in claim 14 wherein said cleat extends inwardly from the periphery of each orifice along the longitudinal center line of either of the legs forming the L-shaped connector.

19. A system as in claim 14 wherein each orifice is substantially rectangular in shape and one axis of the rectangle lies along the line extending from the inner corner of the L-shaped connector to the outer corner of the L-shaped connector.

20. A system as in claim 14 further comprising at least second and third raised flanges on the edge of each of said orifices on the inside of said connector, each of said second and third raised flanges being located substantially 90° from said first raised flange and diametrically opposite each other for providing surfaces for a bolt head and nut when a bolt is extended through the aligned orifices to lock said connectors and said ducts together.

21. A system as in claim 14 wherein the lip on the outer end of each cleat has a curved surface for allowing said lip to extend over the first raised flange on the edge of the aligned orifice of the abutting connector to lock said lip over said raised flange.

22. A duct joining system, such system including two L-shaped abutting connectors for each duct corner, each connector having two substantially perpendicular legs forming a corner region and having an inside and an outside surface, the outside surface of one L-shaped connector abutting the outside surface of the other L-shaped connector for joining two ducts together, said system comprising:
 an orifice in the corner region of each L-shaped connector substantially in alignment with the orifice of the abutting L-shaped connector; and
 a cleat integrally formed with and extending inwardly from the periphery of an orifice in only one of the abutting connectors in a direction along a line extending from the inner corner to the outer corner of one of the L-shaped connectors so as to enable the cleat to be bent through and over the edge of the abutting orifice to lock the connectors together.

23. The system as in claim 22 wherein the legs of each L-shaped connector are flat metal strips having the outer edges thereof turned toward the inside surface thereof to provide stiffening ribs.

24. In a system for joining two ducts together at each corner with first and second L-shaped connectors, each of said connectors having two substantially perpendicular legs forming a corner region and being identical in construction and having an orifice in the corner region thereof, said L-shaped connectors being in abutting relationship with each other when joining each corner of the two ducts, the system including:
 a cleat formed with and extending inwardly from the periphery of each of said orifices;
 the cleat of the orifice in the first connector extending through and over the edge of the orifice in the second connector; and
 the cleat of the orifice in the second connector extending through and over the edge of the orifice in the first connector to lock said connectors in said abutting relationship.

25. A system as in claim 24 further comprising a score line formed on each cleat on the side of the connector facing the abutting connector to allow said cleat to be bent outwardly about said score line and through and over the edge of the orifice in the abutting connector.

26. A system as in claim 25 further comprising:
 a lip on the outer end of each cleat; and
 a first raised flange on the corresponding edge of the orifice of the abutting connector for receiving said lip when said cleat is bent outwardly and extending through and over the edge of the orifice in the abutting connector to lock said lip over said raised flange and lock said connectors in said abutting relationship.

27. A system as in claim 26 wherein said cleat extends inwardly from the periphery of each orifice along an axis perpendicular to a line extending from the inner corner of said L-shaped connector to the outer corner of the L-shaped connector.

28. A system as in claim 26 wherein said cleat extends inwardly from the periphery of each orifice along the longitudinal center line of either of the legs forming the L-shaped connector.

29. A system as in claim 26 wherein each orifice is substantially rectangular in shape and one axis of the rectangle lies along the line extending from the inner corner of the L-shaped connector to the outer corner of the L-shaped connector.

30. A system as in claim 26 further comprising:
 said orifices in said first and second connectors being in alignment when said first and second connectors are in abutting relationship; and
 a bolt extending through said orifices for receiving a nut to assist in locking said connectors in said abutting relationship.

31. A system as in claim 26 further comprising at least second and third raised flanges on the edge of each said orifices on the inside of said connectors, each of said second and third raised flanges being located substantially 90° from said first raised flange and diametrically opposite each other for providing surfaces for a bolt head and nut when a bolt is extended through the aligned orifices to lock said connectors and said ducts together.

32. A method of joining two ducts together at the corners thereof with first and second L-shaped connectors, each of said connectors having first and second substantially perpendicular legs forming a corner region and having an orifice in the corner region thereof, said L-shaped connectors being in an abutting relationship with each other when joining the two ducts, the method comprising the steps of:
 forming a retaining means on the abutting connectors; and
 bending a cleat, with a lip thereon, integrally formed with and extending inwardly from the periphery of said orifice in at least the first connector through the orifice of the second connector so that the lip passes over and around the retaining means to lock said connectors together.

33. A method as in claim 32 further comprising the step of:
 bending a cleat integrally formed with and extending inwardly from the periphery of said orifice in said second connector through and over the edge of the orifice of the first connector thereby locking said connectors together.

34. The method as in claim 33 further comprising the step of forming a score line on each cleat on the side of the connector facing the abutting connector to allow the cleat to be bent outwardly about the score line and through and over the edge of the orifice in the abutting connector.

35. The method as in claim 34 further comprising the step of:
 forming a lip on the outer end of each cleat; and
 forming a first raised flange on the corresponding edge of the orifice in the abutting connector for receiving said lip when said cleat is bent outwardly through and over the edge of the orifice in the abutting connector to lock said lip over said raised flange and lock said connectors in said abutting relationship.

36. The method as in claim 35 further comprising the step of extending said cleat inwardly from the periphery of each orifice along an axis perpendicular to a line extending from the inner corner of said L-shaped connector to the outer corner of the L-shaped connector.

37. The method as in claim 35 further comprising the step of extending said cleat inwardly from the periphery of each orifice along the longitudinal center line of either of the legs forming the L-shaped connector.

38. The method as in claim 35 further including the step of forming each orifice in a substantially rectangular shape with one axis of the rectangle lying along the line extending from the inner corner of the L-shaped connector to the outer corner of the L-shaped connector.

39. The method as in claim 35 further comprising the steps of:
   aligning said orifices in said first and second connectors when said first and second connectors are in abutting relationship; and
   extending a bolt through said orifices for receiving a nut to assist in locking said connectors in said abutting relationship.

40. The method as in claim 39 further comprising the step of forming at least second and third raised flanges on the edge of each of said orifices on the inside of said connector, each of said second and third raised flanges being located substantially 90° from said first raised flange and diametrically opposite each other for providing surfaces for a bolt head and nut when a bolt is extended through the aligned orifices to lock said connectors and said ducts together.

41. The method of claim 32 further comprising the step of forming locking means on each of the abutting connectors for engaging each other to resist movement of said abutting connectors with respect to each other during bending of each cleat through and over the edge of the orifice on the abutting connector.

42. The method of claim 41 further comprising the step of forming a knurled surface on at least a portion of said corner region of each connector to resist movement of the abutting connectors with respect to each other during bending of each cleat through and over the edge of the orifice in the abutting connector.

43. The method of claim 41 further comprising the steps of forming a raised offset surface on said corner region of one connector to engage a corresponding offset surface on the corner region of an abutting connector to resist movement of the abutting connector with respect to each other during bending of each cleat through and over the edge of the orifice in the abutting connector.

* * * * *